United States Patent
Iwai

(10) Patent No.: US 7,995,088 B2
(45) Date of Patent: Aug. 9, 2011

(54) OPTICAL SCANNING APPARATUS AND IMAGE FORMING APPARATUS COMPRISING THE SAME

(75) Inventor: Hitoshi Iwai, Abiko (JP)

(73) Assignee: Canon Kabushiki Kaisha (JP)

( * ) Notice: Subject to any disclaimer, the term of this patent is extended or adjusted under 35 U.S.C. 154(b) by 827 days.

(21) Appl. No.: 11/960,053

(22) Filed: Dec. 19, 2007

(65) Prior Publication Data
US 2008/0151036 A1    Jun. 26, 2008

(30) Foreign Application Priority Data

Dec. 25, 2006  (JP) ................................. 2006-347772
Dec. 14, 2007  (JP) ................................. 2007-324018

(51) Int. Cl.
*B41J 27/00* (2006.01)
(52) U.S. Cl. ......................... 347/260; 347/241; 347/256
(58) Field of Classification Search ................... 347/260, 347/241, 256
See application file for complete search history.

(56) References Cited

U.S. PATENT DOCUMENTS

| | | | | |
|---|---|---|---|---|
| 4,587,531 A | * | 5/1986 | Dangler | 347/250 |
| 5,043,744 A | * | 8/1991 | Fantuzzo et al. | 347/250 |
| 5,218,377 A | * | 6/1993 | Kataoka et al. | 347/246 |
| 5,396,276 A | * | 3/1995 | Senda et al. | 347/255 |
| 6,137,616 A | * | 10/2000 | Inagaki et al. | 359/204.1 |
| 6,754,161 B1 | * | 6/2004 | Masuhara et al. | 369/112.01 |
| 2003/0174201 A1 | * | 9/2003 | Kimura | 347/258 |

FOREIGN PATENT DOCUMENTS

| | | |
|---|---|---|
| JP | 58-5719 A | 1/1983 |
| JP | 9-96769 A | 4/1997 |
| JP | 9-230259 A | 9/1997 |
| JP | 2003-152255 A | 5/2003 |
| JP | 2003-215485 A | 7/2003 |
| JP | 2007-212531 A | 8/2007 |

* cited by examiner

*Primary Examiner* — Stephen D Meier
*Assistant Examiner* — Sarah Al-Hashimi
(74) *Attorney, Agent, or Firm* — Rossi, Kimms, McDowell LLP

(57) ABSTRACT

A optical scanning apparatus includes a surface emitting type laser diode, a collimator lens which converts the emitted laser beam into an substantially parallel laser beam, a stop member which shapes the substantially parallel laser beam into a desired shape, a polygon mirror which deflects and scans the shaped laser beam, an electro-optical crystal member which is provided in the optical path between the stop member and the polygon mirror, and deflects the shaped laser beam by an applied voltage, a light amount sensor which detects the amount of laser beam deflected by the electro-optical crystal member, and a light amount control unit which controls the amount of laser beam emitted from the laser diode while repeatedly comparing the detected light amount obtained from the light amount sensor with a light amount corresponding to a reference voltage for control light amount.

7 Claims, 12 Drawing Sheets

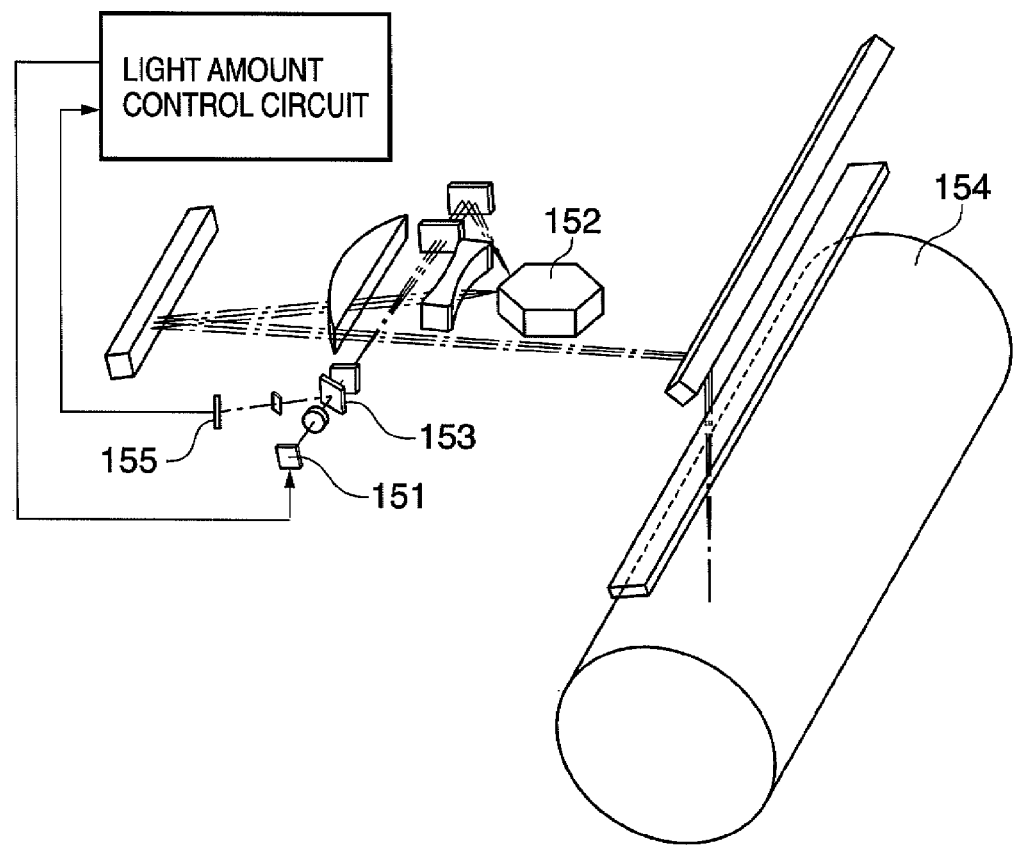
F I G. 12

OPTICAL SCANNING APPARATUS AND IMAGE FORMING APPARATUS COMPRISING THE SAME

BACKGROUND OF THE INVENTION

1. Field of the Invention

The present invention relates to an optical scanning apparatus provided in an image forming apparatus such as a copying machine or a printer, and an image forming apparatus comprising the optical scanning apparatus.

2. Description of the Related Art

An optical scanning apparatus comprised in an electrophotographic image forming apparatus drives a semiconductor laser in accordance with input image data and forms an electrostatic latent image corresponding to the input image data on a photosensitive member. To achieve operation at higher speed and higher resolution, it is necessary to rotate a polygon mirror at higher speed, which is used to scan a laser beam from the semiconductor laser on the photosensitive member, or to increase the number of emission points in the semiconductor laser, from which laser beams are emitted, thereby increasing the number of laser beams which simultaneously scan on the photosensitive member.

There is, however, a limit to higher speed rotation of the polygon mirror in consideration of generated heat, generated noise and strength of the polygon mirror itself.

Recently, therefore, an arrangement using a surface emitting laser array (VCSEL: Vertical Cavity-Surface Emitting Laser) as a light source capable of generating a large number of laser beams, in place of conventional laser diodes in end face emitting type has been commercialized.

Since the laser beam output characteristics of a semiconductor laser are sensitive to a change in ambient temperature, the laser beam output greatly varies due to the change in ambient temperature or the self-heating even if the semiconductor laser is driven at a constant current. To cope with the temperature dependence of the laser beam output, a photodiode called a monitor diode is incorporated with the laser diode in end face emitting type in the semiconductor laser package. The monitor diode monitors an output of back light of the semiconductor laser to control the drive current, thereby being able to keep the laser beam output constant. A driving circuit which performs laser beam Amount control of the semiconductor laser having such a feedback mechanism is called an APC (Auto Power Control) circuit.

The VCSEL can emit laser beam only in one direction owing to structural limitations, and hence cannot perform APC by monitoring the output of back light unlike the laser diode in end face emitting type.

Japanese Patent Laid-Open No. 2003-215485 proposes the following light amount detection arrangement. As shown in FIG. 12, there is proposed an arrangement in which a part of a laser beam emitted from a light source 151 and traveling to a photosensitive member 154 is split using a half mirror 153 placed in an optical path from the light source 151 to a polygon mirror 152, the split laser beam is guided to a photodiode (to be referred to as a "PD" hereinafter) 155, and a light amount of the laser beam is detected by the photodiode 155.

Japanese Patent Laid-Open No. 9-230259 proposes an arrangement in which a light amount control is performed using a BD sensor which detects a sync signal serving as a write start reference of the laser beam in the main scanning direction corresponding to the longitudinal direction of the photosensitive member.

However, the image forming apparatus described above has the following problem when the apparatus does not measure the light amount of a back light, but measures the light amount of a laser beam directed from the light source to the photosensitive member and performs a light amount control of the laser beam.

More specifically, in the arrangement in which a part of a light amount obtained by splitting the laser beam emitted from the VCSEL using the half mirror is detected, the light amount of the laser beam used for scanning a photosensitive member is reduced to half due to the splitting of the laser beam. Since the VCSEL structurally has a weak point that the laser resonator length is short and the maximum output is small, a light amount large enough to scan the photosensitive member may not be obtained.

In this arrangement, in order to prevent the remaining part of split laser beams from scanning on the photosensitive member during light emission for APC, it is necessary to perform APC within a non-scanning area in which no laser beam scans on the photosensitive member. This is because when a latent image may be formed on the photosensitive member by light emission for APC, toner is placed at an unintended position other than the position where an image should be formed at the time of development. This may cause smearing on an end portion of an output sheet, cleaning failure on the photosensitive member, and the like.

In the arrangement in which the light amount control is performed using the BD sensor, since light amount detection is performed using scanning light reflected by the polygon mirror, the time during which a laser beam irradiates on the BD sensor is very short, and then there is a problem that a light amount sufficient for accurate light amount detection may not be obtained.

SUMMARY OF THE INVENTION

An object of the present invention is to provide an optical scanning apparatus which can perform accurate light amount control by efficiently using a laser beam emitted from a light source and an image forming apparatus comprising the optical scanning apparatus.

An aspect of the present invention provides an optical scanning apparatus comprising: a light source adapted to emit a light beam; a light scanning unit adapted to deflect the light beam emitted from the light source to scan on an image carrier; an electro-optical crystal member which is provided in an optical path between the light source and the light scanning unit and deflects the light beam emitted from the light source by an applied voltage; at least a light amount detecting unit adapted to detect an amount of light beam deflected by the electro-optical crystal member; and a light amount control unit adapted to control the amount of laser beam emitted from the light source based on detection result obtained by the at least light amount detecting units. The electro-optical crystal member is made of an electro-optical crystal having a characteristic that a refractive index of the electro-optical crystal changes upon an applied voltage, and the light amount detecting unit detects an amount of a light beam upon application of a voltage to the electro-optical crystal. The electro-optical crystal member is made of an electro-optical crystal having a characteristic that a refractive index of the electro-optical crystal changes upon an applied voltage, and the optical scanning apparatus further comprises a voltage control unit adapted to control a voltage applied to the electro-optical crystal. The voltage control unit comprises a pair of electrode mounted on surfaces of the electro-optical crystal, and a voltage applied to the pair of electrode forms an electric field in the electro-optical crystal at a right angle with respect to a traveling path of the light beam passing through the electro-optical crystal. The electro-optical crystal essentially consists of potassium, tantalum, niobium and oxygen. The light source is a surface emitting type laser diode. The optical scanning apparatus further comprises a first lens member which converts the light beam emitted from the light source into a substantially parallel laser beam, a stop member which shapes the substantially parallel light beam converted by the first lens member into a desired shape, and a second lens member which changes the light beam shaped by the stop member in a sub-scanning direction, and makes the changed light beam travel to an incident face of the electro-optical crystal.

Another aspect of the present invention provides an image forming apparatus comprising the above mentioned optical scanning apparatus, comprising a processing unit adapted to control turning on and off of the light source and a voltage applied to the electro-optical crystal by the voltage control unit, wherein the processing unit, along with scanning of a laser beam in a main scanning direction, upon BD detection after turning on the light source, turns off the light source and causes the voltage control unit to apply a predetermined voltage to the electro-optical crystal, causes the light amount control unit to start light amount control by making the light source turn on, upon completion of the light amount control, turns off the light source and causes the voltage control unit to stop applying the predetermined voltage to the electro-optical crystal, and causes the light scanning unit to scan the light beam on an image carrier by turning on the light source to emit light.

Further aspect of the present invention provides an optical scanning apparatus comprising: a light source having a plurality of light-emitting portions adapted to emit a plurality of light beams; a light scanning unit adapted to scans the light beams emitted from the light source; an electro-optical crystal member which is provided in an optical path between the light source and the light scanning unit and deflects the laser beams emitted from the light source by applied voltages; a plurality of light amount detecting units adapted to detect the amounts of laser beams deflected in different directions by the electro-optical crystal member; and a light amount control unit adapted to control the amount of laser beams emitted from the light source based on detection results obtained by the plurality of light amount detecting units, wherein the electro-optical crystal member makes a plurality of laser beams emitted from the plurality of light-emitting portions irradiate on the different light amount detecting units by application of different voltages in accordance with respective the light-emitting portions of the light source, and the light amount control unit controls the amount of one laser beam based on a detection result obtained by one light amount detecting unit, and controls the amount of another laser beam based on a detection result obtained by another light amount detecting unit. The electro-optical crystal member is made of an electro-optical crystal having a characteristic that a refractive index of the electro-optical crystal changes upon an applied voltage, and the optical scanning apparatus further comprises a voltage control unit adapted to control the different voltages applied to the electro-optical crystal.

Still further aspect of the present invention provides an image forming apparatus comprising the above mentioned optical scanning apparatus, comprising a processing unit adapted to control turning on and off of the light source and a voltage applied to the electro-optical crystal by the voltage control unit, wherein the processing unit, along with scanning of a laser beam in a main scanning direction, upon BD detection after starting turning on one light-emitting portion of the light source, turns off the one light-emitting portion of the light source, and causes the voltage control unit to apply a first voltage to the electro-optical crystal, causes the light amount control unit to start light amount control by making the one light-emitting portion of the light source turn on, upon completion of the light amount control, turns off the one light-emitting portion of the light source and causes the voltage control unit to apply a second voltage to the electro-optical crystal, causes the light amount control unit to start light amount control on another laser beam by emitting light from the another light-emitting portion of the light source, upon completion of the light amount control, turns off the another light-emitting portion of the light source and stops application of voltage to the electro-optical crystal by the voltage control unit, and causes the light scanning unit to scan the light beams on an image carrier by turning on the plurality of light-emitting portions of the light source.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a view showing an arrangement of a conventional laser scanning apparatus.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Arrangement Example of Optical Scanning Apparatus of Embodiment>

Figure 1:
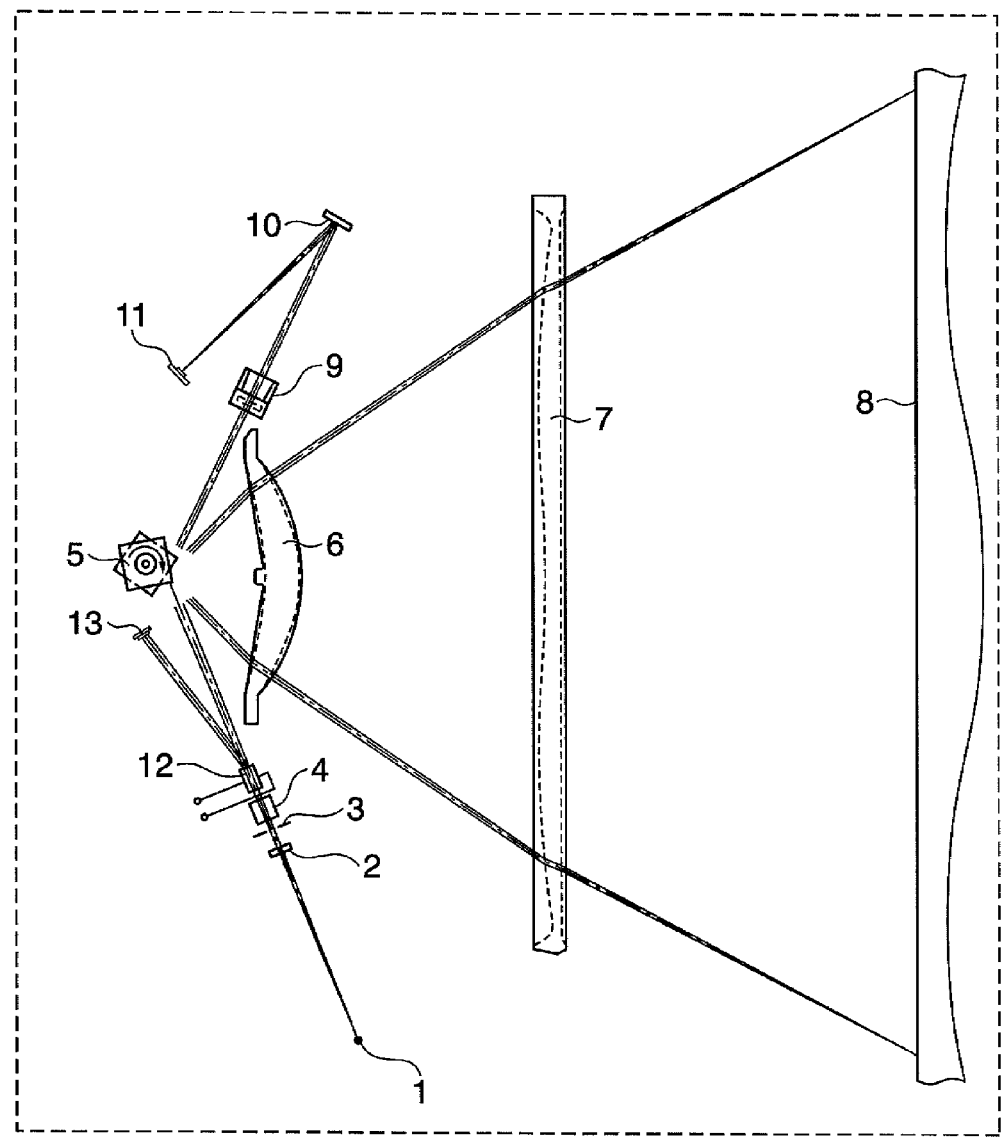
FIG. 1 is a plan view schematically showing an arrangement of a laser scanning apparatus according to a first embodiment of the present invention.

FIG. 1 is a plan view schematically showing the arrangement of a laser scanning apparatus as a optical scanning apparatus according to a first embodiment of the present invention.

Referring to FIG. 1, a laser scanning apparatus 100 comprises a surface emitting type laser diode (referred as a light source) 1 and a collimator lens (first lens member) 2 which converts a laser beam (laser light) emitted from the laser diode 1 into a substantially parallel laser beam. This apparatus also comprises a stop member 3 which shapes the substantially parallel laser beam converted by the collimator lens 2 into a desired shape, and a cylindrical lens (referred as a second lens member) 4 which changes an optical path of the laser beam shaped by the stop member 3 in the sub-scanning direction and makes the laser beam an incident light to an electro-optical crystal 21 (to be described later). The apparatus further comprises a polygon mirror (referred as a light scanning unit) 5 which scans a laser beam, and an electro-optical crystal member 12 which comprises the electro-optical crystal 21 and is provided in the optical path between the stop member 3 and the polygon mirror 5 to deflects a laser beam emitted from the light source in the main scanning direction by an applied voltage. In addition, the apparatus comprises a light amount sensor (referred as a light amount detecting unit) 13 which detects the amount of laser beam deflected in the main scanning direction by the electro-optical crystal member 12, and f-θ lenses 6 and 7 which form an image on a photosensitive drum 8 by the laser beam deflected and scanned by the polygon mirror 5.

The light amount sensor 13 is provided upstream of the polygon mirror 5. This makes it possible to perform APC for a laser beam using a static laser beam instead of a scanning laser beam.

A laser beam emitted from the laser diode 1 passes through the collimator lens 2 to be converted into a parallel laser beam. The converted laser beam then passes through the stop member 3, which shapes a parallel light into a desired shape, and the cylindrical lens 4, which changes a laser beam only in the sub-scanning direction. The beam then is input to the polygon mirror 5 and is deflected and scanned. The laser beam deflected and scanned by the polygon mirror 5 passes through the f-θ lenses 6 and 7 to be formed into a spot on the photosensitive drum 8, thereby forming a static latent image on the photosensitive drum 8.

A BD sensor 11 detects a horizontal sync signal (BD signal) which serves as a write reference signal in the main scanning direction for forming the static latent image on the photosensitive drum 8. A laser beam at a side preceding a start of the image forming area is focused while passing through a BD lens 9 and is returned by a BD mirror 10. The laser beam then irradiates on a BD sensor 11.

(Arrangement Example of Electro-Optical Crystal Member 12)

Figure 2:
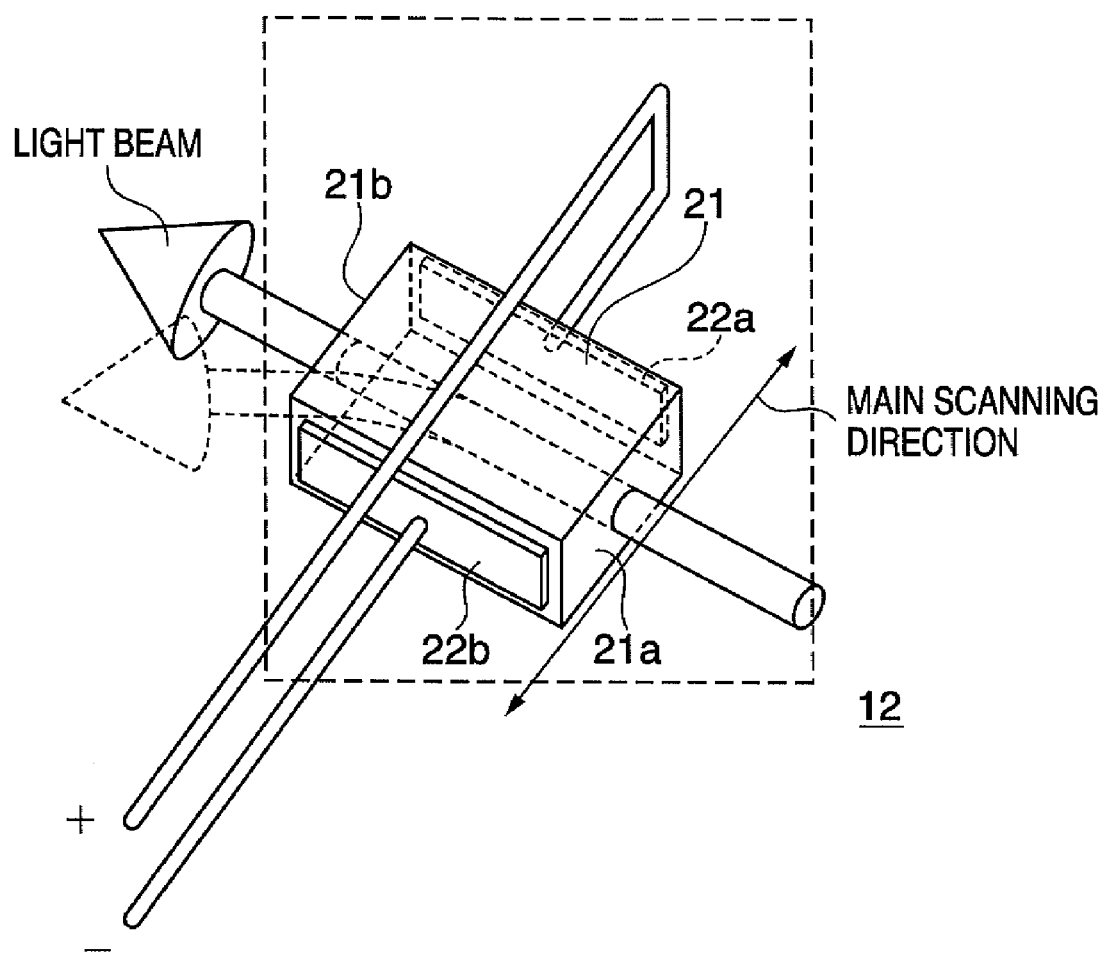
FIG. 2 is a perspective view schematically showing an arrangement of an electro-optical crystal member in FIG. 1.

As shown in FIG. 2, the electro-optical crystal member 12 comprises a rectangular parallelepiped electro-optical crystal (to be referred as an "EO crystal" hereinafter) 21 having an incident surface 21a and an exiting surface 21b of a laser beam. The electro-optical crystal member 12 also comprises a pair of electrodes 22a and 22b mounted on the two end faces of the EO crystal 21, which extend at a right angle with respect to the main scanning direction, and a power supply (not shown) for applying a voltage between the pair of electrodes 22a and 22b.

The electrodes 22a and 22b each have a linear stripe shape with a relatively short electrode width "d" and a length "L." The electrodes 22a and 22b are made of a material such as Au, but may be made of another conductive material. The electrodes 22a and 22b are manufactured by vacuum vapor deposition.

The voltage applied between the pair of electrodes 22a and 22b forms an electric field in the EO crystal 21 in a direction (the sub-scanning direction in FIG. 2) perpendicular to the traveling path of the laser beam passing through the EO crystal 21.

While no voltage is applied to the electrodes 22a and 22b, the EO crystal 21 does not exhibit the lens function and directly guides an incident laser beam income from the incident surface 21a to a polygon mirror 5 without deflecting the incident laser beam.

A voltage of 5 to 10 kV at maximum is applied to the pair of electrodes 22a and 22b to generate an electric field in the EO crystal 21, thereby generating an electric field distribution. Thus, the laser beam is deflected in the sub-scanning direction by ten and several degrees of angle, for example, 12° within a time of several ms to ns. While no image is formed, the electro-optical crystal member 12 deflects the laser beam in the main-scanning direction at the optical path upstream of the polygon mirror 5 and guides it to the light amount sensor 13 using an electro-optical effect at high speed and wide angle.

The electro-optical crystal here means a crystal having a characteristic such that its refractive index changes upon an applied voltage. The EO crystal 21 is an electro-optical crystal such as a KTN ($KTa_{1-x}Nb_xO_3$, typically $KTaNbO_3$: Potassium Tantalate Niobate) crystal having as components potassium, tantalum, niobium and oxygen. The KTN crystal can be handled like normal optical glass, and has excellent processability so as to easily ensure surface precision in cutting and polishing. The KTN crystal has the internal light transmittance of 95% or more per meter in the laser wavelength range of infrared light to visible light. The KTN crystal has a low birefringence. The water absorbance of the KTN crystal is less than that of normal glass and extremely low with respect to resins.

As is well known, the internal refractive index of the KTN crystal changes upon application of an electric field to it. When electrodes (voltage at one electrode=V, and voltage at the other electrode=0) are attached to the two ends of the KTN crystal to generate an internal electric field, the internal electric field has a gradient profile, and hence the refractive index has a gradient index profile. Laser beam travels while changing the traveling direction. The KTN crystal is characterized by high-speed and wide-angle operation.

In accordance with an increase in voltage applied to the two end portions of the EO crystal 21, the direction of a laser beam passing through the EO crystal 21 is greatly deflected in the electric field direction.

According to the present invention, using this phenomenon changes the traveling direction during laser beam transmission through the KTN crystal.

Note that in this embodiment, the deflecting angle for guiding a laser beam to the light amount sensor 13 is set to 12°. In order to reliably split an incident laser beam, even if a return mirror smaller than a light amount sensor is used, at least a deflecting angle of 3° or more by the EO crystal is required.

<Arrangement Example of Image Forming Apparatus Comprising Optical Scanning Apparatus>

Figure 3:
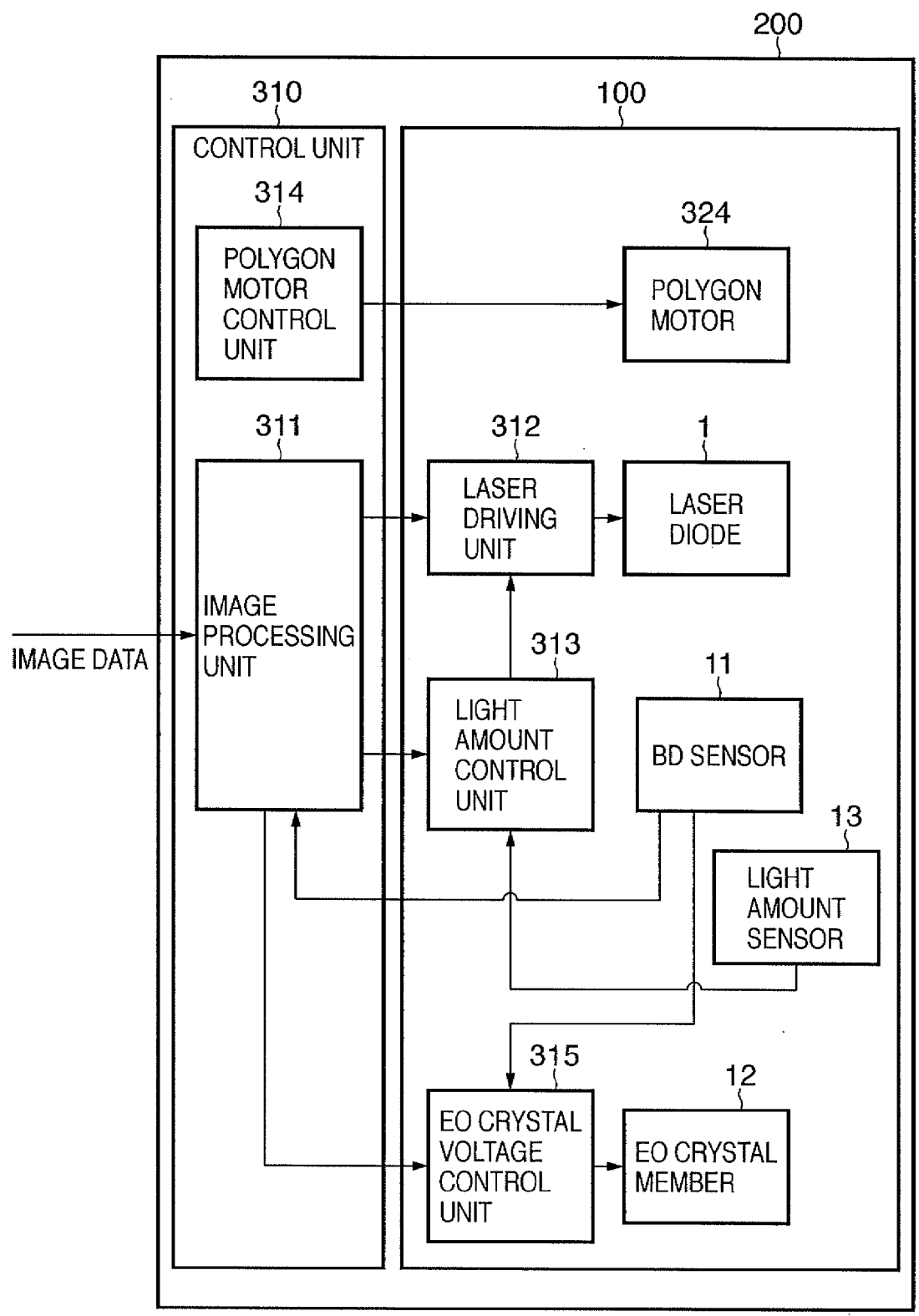
FIG. 3 is a block diagram schematically showing an arrangement of an image forming apparatus comprising the laser scanning apparatus in FIG. 1.

FIG. 3 is a block diagram schematically showing the arrangement of an image forming apparatus comprising the laser scanning apparatus in FIG. 1.

Referring to FIG. 3, a control unit 310 of an image forming apparatus 200 includes an image processing unit 311 and polygon motor control unit 314. A laser scanner apparatus 100 includes the laser diode 1, the light amount sensor 13 for detecting the amount of laser beam from the laser diode 1, the BD sensor 11, a laser driving unit 312, a light amount control unit 313, an EO crystal voltage control unit 315, a polygon motor 324 for rotating the polygon mirror 5, and the electro-optical crystal structure 12.

The image processing unit 311 outputs an instruction for performing light amount control in a non-image forming region to the light amount control unit 313 based on a BD signal obtained from the BD sensor 11. Upon receiving an instruction from the image processing unit 311, the light amount control unit (referred as control unit) 313 causes the laser diode 1 to emit laser beam. The light amount control unit 313 then controls the amount of laser beam emitted from the laser diode 1 to a desired light amount while repeatedly comparing the detected light amount obtained from the light amount sensor 13 with a light amount corresponding to a reference voltage (corresponding to APC). When the detected light amount becomes equal to a predefined value, the image processing unit 311 outputs a video signal for ON/OFF-controlling a laser beam to the laser driving unit 312 based on an image data input from a external device.

Note that since the present invention is not associated with the details of APC but is associated with an arrangement and control for the detection of a light amount by the light amount sensor, a detailed description of the operational contents of APC will be omitted.

The EO crystal voltage control unit 315 transmits an instruction for applying a voltage to the EO crystal 21 in the electro-optical (EO) crystal member 12 to the laser scanning apparatus 100, based on the BD signal obtained from the BD sensor 11 before the execution of APC for the laser diode 1. The EO crystal 21 guides a laser beam to the light amount sensor 13 in accordance with the high-speed, wide-angle electro-optical effect. The EO crystal voltage control unit 315 further transmits an instruction to stop the application of a voltage to the EO crystal 21 at the timing of the end of APC. Therefore, the EO crystal 21 does not have the lens function, and the incident beam from the incident surface 21a directly exits from the exiting surface 21b toward the polygon mirror 5.

<Operation Example of Optical Scanning Apparatus of Embodiment>

Figure 4:
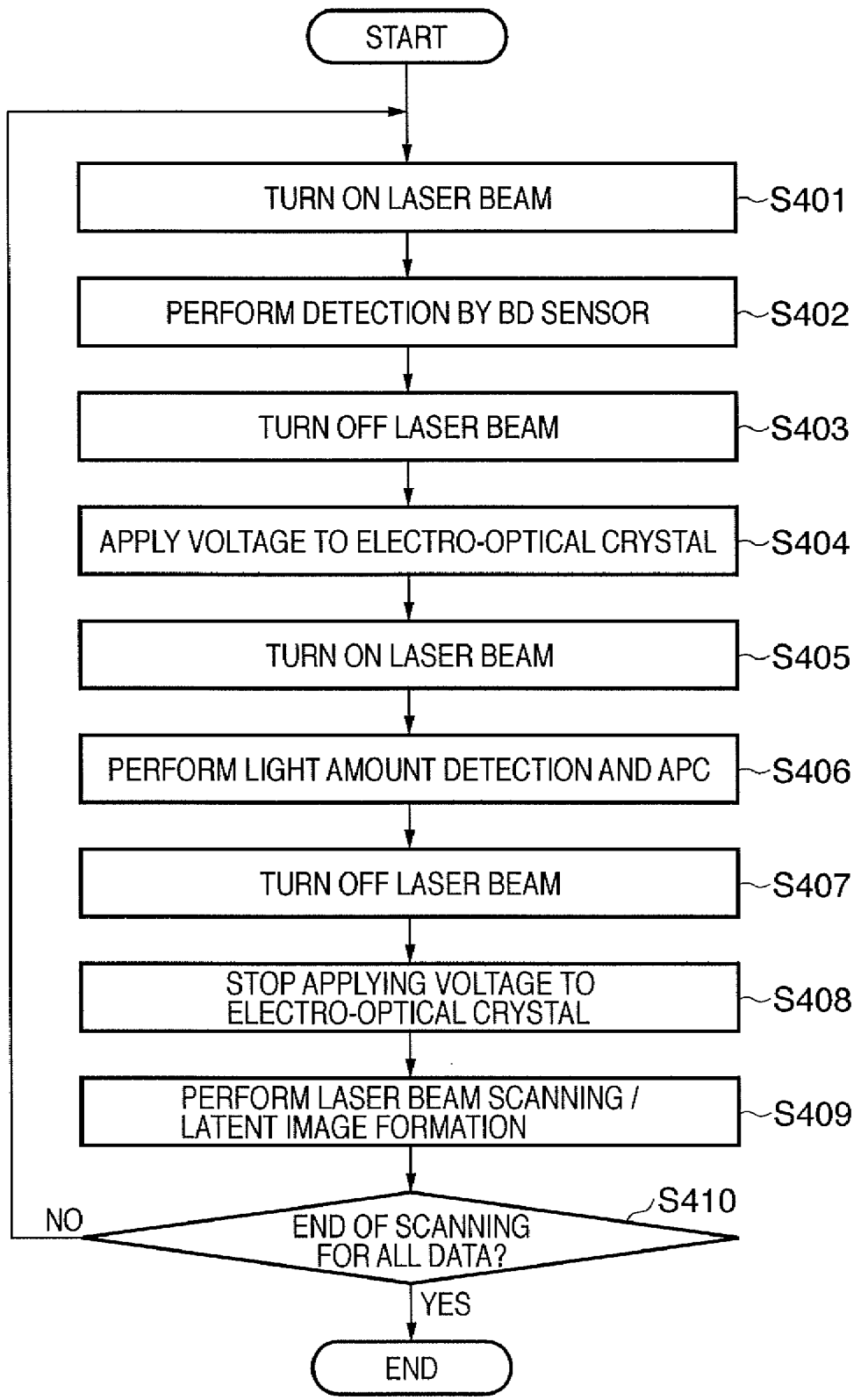
FIG. 4 is a flowchart for explaining APC for a laser beam in scanning of one line.

FIG. 4 is a flowchart for explaining APC for a laser beam in scanning of one line in the main scanning direction.

Referring to FIG. 4, the user presses the copy button of the operation unit (not shown) or this apparatus receive a print instruction transmitted from an external device such as a PC. When the polygon mirror 5 rotates at a constant speed, the laser diode 1 then turn on and emits a laser beam as a reference for control on the light emission timing in the main scanning direction (step S401), and the BD sensor 11 detects a BD signal based on the emitted laser beam (step S402). When the BD signal is detected, the laser beam is turned off (step S403), and a predetermined voltage is applied between the pair of electrodes 22a and 22b of the electro-optical crystal member 12.

With this operation, the predetermined voltage is applied to the EO crystal 21 (step S404). While the predetermined voltage is kept applied to the EO crystal 21, a laser beam is turned on and emitted (step S405). This apparatus then controls the electric field generated in the EO crystal 21 to deflect a laser beam by about 12° in the main scanning direction, thereby making the laser beam irradiate on the light amount sensor 13. The apparatus performs APC based on the amount of laser beam detected by the light amount sensor 13 (step S406). When APC is complete, the apparatus turns off the laser beam (step S407), and stops applying a voltage to the EO crystal 21 (step S408).

When the application of a voltage to the EO crystal 21 stops, the direction of the laser beam emitted from the laser diode 1 returns from the direction toward the light amount sensor 13 to the direction toward the polygon mirror 5. Subsequently, the apparatus turns on the laser beam so as to perform scanning and formation of a static latent image on the photosensitive drum 8 with the laser beam whose amount is controlled by APC (step S409). The apparatus discriminates whether or not scanning for all the image data is complete (step S410). If scanning for all the image data is not complete, the process returns to step S401 and controls to scan next line on the photosensitive drum 8. If scanning for all the image data is complete, this processing is terminated.

Figure 5:
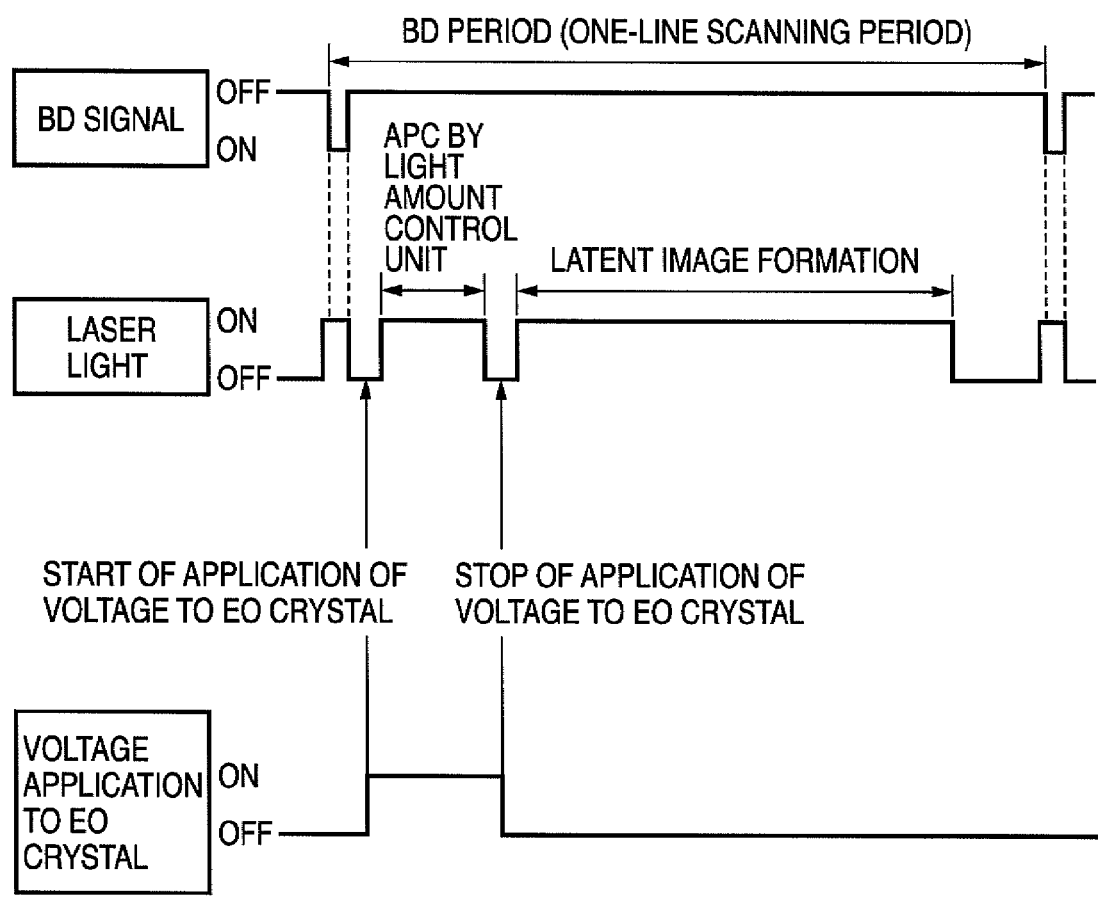
FIG. 5 is a view for explaining the relationship between the ON/OFF timing of a BD signal and the ON/OFF timing of a laser beam in scanning of one line.

FIG. 5 is a view for explaining the relationship between the ON/OFF timing of a BD signal, the ON/OFF timing of a laser beam, and the ON/OFF timing of applying a voltage to the EO crystal in scanning of one line in the main scanning direction.

As shown in FIG. 5, this apparatus turns on and starts emitting light from a phase immediately before a laser beam irradiates on the BD sensor 11, and turns off the laser beam at the same time as the detection of a BD signal. When the EO crystal voltage control unit 315 inputs a voltage application signal for applying a predetermined voltage to the EO crystal 21, the light amount control unit 313 performs APC on the laser diode 1. When a light amount is determined upon completion of APC, the application of a voltage to the EO crystal 21 stops, and then a static latent image is formed on the photosensitive drum 8 by a laser beam with the light amount determined by APC.

This operation is repeated every line scanning (scanning for each surface of the polygon mirror) on the photosensitive member in the main scanning direction. Therefore, before every line scanning in the main scanning direction, it is always performed to control the light amount.

Effects of First Embodiment

According to this embodiment, the electro-optical crystal member 12 is provided in the optical path between the laser diode 1 and the polygon mirror 5, and the laser beam emitted from the laser diode 1 is deflected in the main scanning direction by a applied voltage. The light amount sensor 13 then detects the amount of laser beam deflected in the main scanning direction, and the light amount control unit 313 controls the amount of laser beam emitted from the laser diode 1 based on the detection result obtained by the light amount sensor 13. This makes it possible to adjust the amount of laser beam without splitting a laser beam halfway and hence to perform accurate APC by efficiently using the laser beam emitted from the laser diode 1. In addition, this apparatus can perform APC using an entire laser beam without splitting the laser beam emitted from the light source by using a half mirror as in the prior art. For this reason, even if a light source with a small maximum output like a VCSEL is used, accurate APC can be performed by efficiently using a laser beam.

The KTN crystal is used as the electro-optical crystal member 12. The KTN crystal has the internal light transmittance of 95% or more per meter in the laser wavelength range of infrared light to visible light. In addition, the KTN crystal has a low birefringence. This makes it possible to perform high-precision APC.

In addition, since the light amount sensor 13 is provided upstream of the polygon mirror 5, even if a light source with a small maximum output like a VCSEL is used, accurate APC can be performed by efficiently using a laser beam.

Furthermore, when light emission for APC is performed, an entire laser beam is deflected in the direction of the light amount sensor and irradiates on the light amount sensor. This eliminates the anxiety that light emitted for APC will scan on the photosensitive drum as in the laser beam splitting scheme, and then allows to perform APC using the most of a non-image forming region.

In this embodiment, the electro-optical crystal member 12 is provided in the optical path between the stop member 3 and the polygon mirror 5. However, the present invention is not limited to this arrangement. The electro-optical crystal member 12 may be provided anywhere in the optical path between the laser diode 1 and the stop member 3.

<Second Arrangement Example of Optical Scanning Apparatus of Embodiment>

Figure 6:
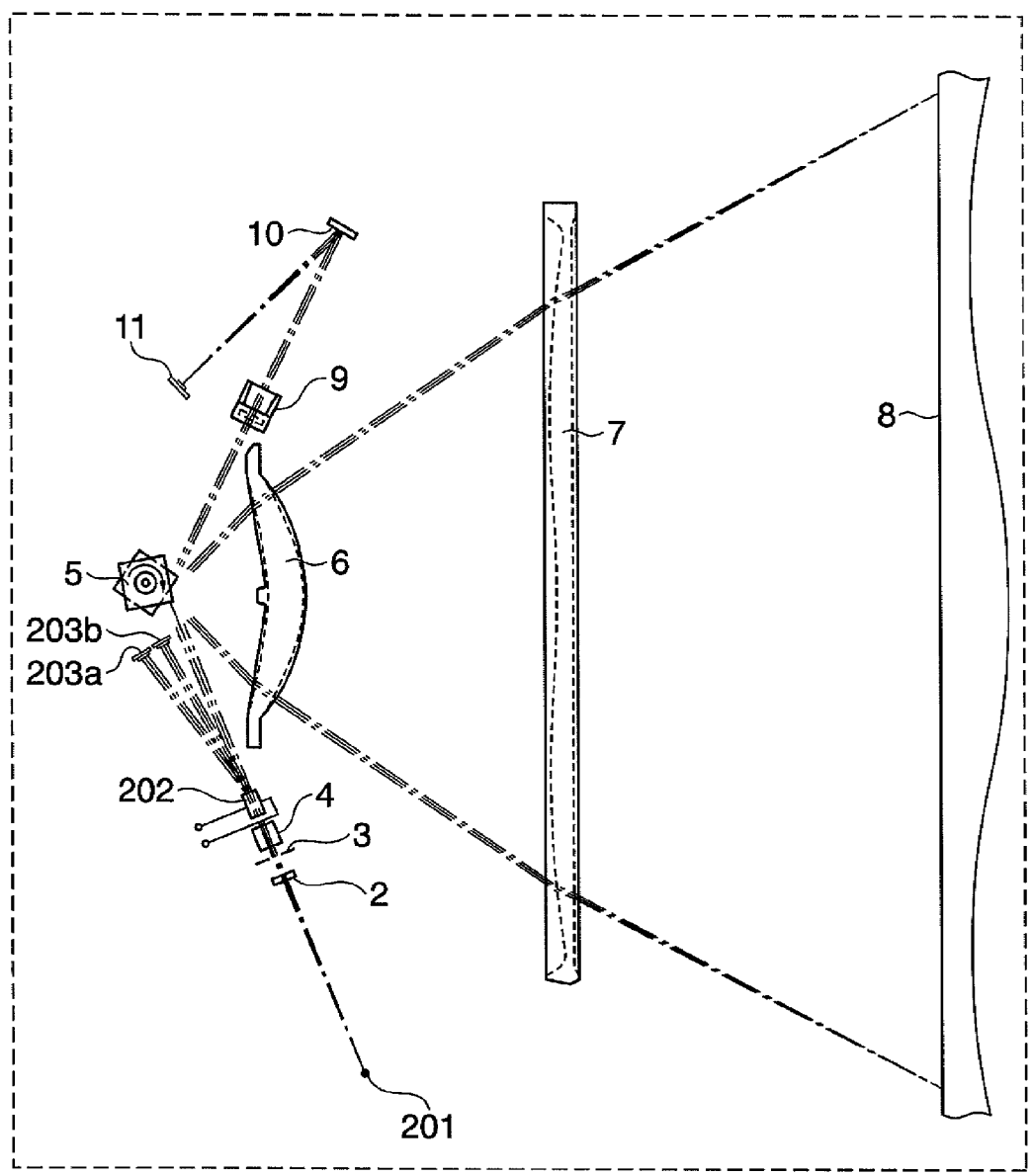
FIG. 6 is a plan view schematically showing an arrangement of a laser scanning apparatus according to the second embodiment of the present invention.

FIG. 6 is a plan view schematically showing the arrangement of a laser scanning apparatus as a optical scanning apparatus according to the second embodiment of the present invention. The arrangement of the second embodiment is similar to that of the first embodiment. The same reference numerals as in the first embodiment denote the same constituent elements, and a repetitive description will be omitted. Different portions will be described below.

A laser scanning apparatus 200 comprises a monolithic multi-beam laser diode (to be referred to as an "MMLD" hereinafter) 201 having two light-emitting portions. This apparatus comprises an electro-optical crystal member 202 which deflects two laser beams (laser beam A and laser beam B) emitted from the MMLD 201 in different directions by an applied voltage. The apparatus also comprises two light amount sensors 203a and 203b which respectively detect the light amounts of deflected laser beams.

That is, the first embodiment comprises one light amount sensor, but the second embodiment comprises the light amount sensors 203a and 203b corresponding to multiple beams (laser beam A and laser beam B) emitted from the two light-emitting portions. The EO crystal member 202 reflects and guides the laser beams emitted from the two light-emitting portions to the light amount sensors 203a and 203b. A light amount control unit 313 controls the amount of laser beam A based on the detection result obtained by the light amount sensor 203a, and further controls the amount of laser beam B based on the detection result obtained by the light amount sensor 203b.

<Operation Example of Second Arrangement of Optical Scanning Apparatus>

Figure 7:
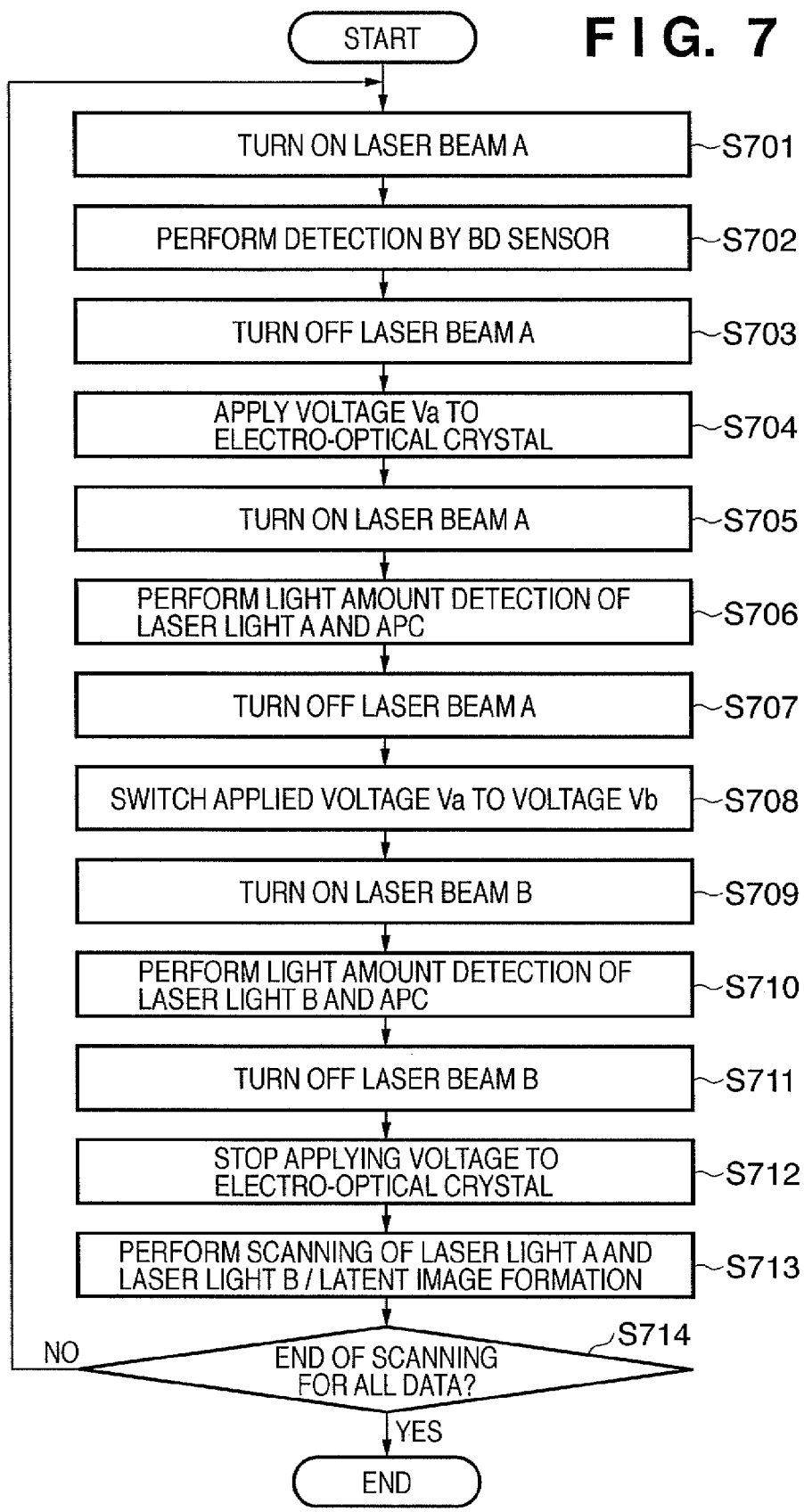
FIG. 7 is a flowchart for explaining APC for a laser beam in scanning of one line which is executed by the laser scanning apparatus in FIG. 6.

FIG. 7 is a flowchart for explaining APC for a laser beam in scanning of one line which is executed by the laser scanning apparatus in FIG. 6.

Referring to FIG. 7, when the user presses the copy button of the operation unit or this apparatus receives a print instruction transmitted from an external device such as a PC, the MMLD 201 turns on and emits the laser beam A as a reference for control on the light emission timing in the main scanning direction (step S701), and a BD sensor 11 detects a BD signal (step S702). At the same time when a BD signal is detected, the laser beam A is turned off (step S703), and a predetermined voltage is applied between a pair of electrodes 22a and 22b of an electro-optical crystal member 12. With this operation, a voltage Va is applied to an EO crystal 21 (step S704). The voltage Va is a predetermined voltage for guiding incident light to the light amount sensor 203a by the electro-optical effect of the EO crystal 21, and is about 5 to 10 kV. This apparatus turns on and emits the laser beam A while holding the voltage Va (step S705), and deflects the laser beam A by about 12° in the main scanning direction by controlling the electric field generated in the EO crystal 21, thereby making the laser beam A irradiate on the light amount sensor 203a. The apparatus then performs APC based on the amount of laser beam A detected by the light amount sensor 203a (step S706).

When APC for the laser beam A is complete, the laser beam A is turned off (step S707), and the voltage Va applied to the EO crystal 21 is switched to a voltage Vb (step S708) The voltage Vb is a predetermined voltage for guiding incident light to the light amount sensor 203b and is about half the voltage Va in this embodiment. The apparatus turns on and emits the laser beam B while holding the voltage Vb (step S709), and deflects the laser beam B by about 6° in the main scanning direction by controlling the electric field generated in the EO crystal 21, thereby making the laser beam irradiate on the light amount sensor 203b. The apparatus performs APC based on the amount of laser beam B detected by the light amount sensor 203b (step S710). When APC for the laser beam B is complete, the laser beam B is turned off (step S711), and the application of a voltage Vb to the EO crystal 21 stops (step S712).

When the application of a voltage Vb to the EO crystal 21 stops, the direction of the laser beam B emitted from the MMLD 201 returns from the direction toward the light amount sensor 203b to the direction toward the polygon mirror 5. Subsequently, the apparatus turns on the laser beam so as to perform scanning and formation of a static latent image on the photosensitive drum 8 with the laser beam A and the laser beam B whose amounts are respectively controlled by APC (step S713). The apparatus discriminates whether scanning for all the image data is complete (step S714). If scanning for all the image data is not complete, the process returns to step S701 and controls to scan next line on the photosensitive drum 8. If scanning for all the image data is complete, this processing is terminated.

(Case of One Light Amount Sensor)

Figure 8:
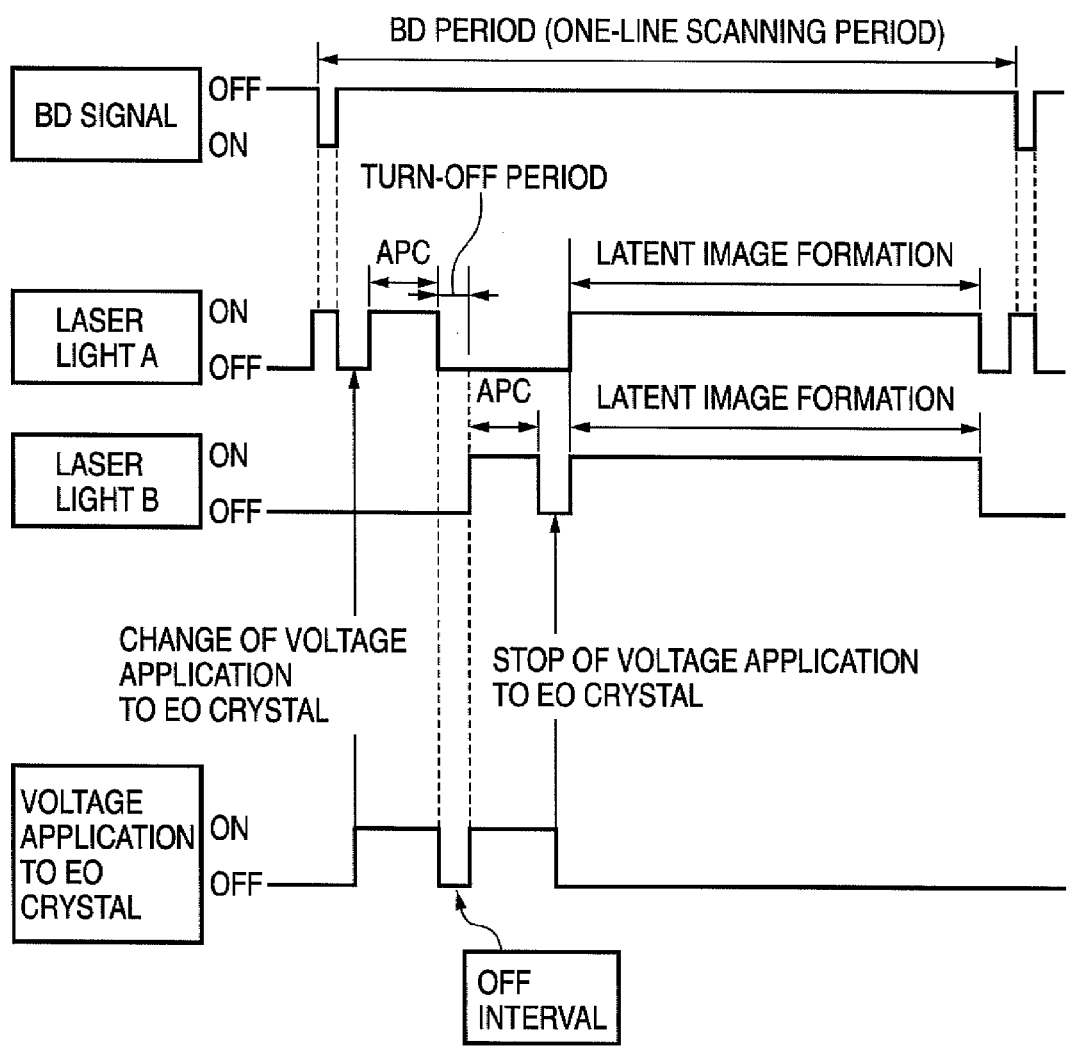
FIG. 8 is a view for explaining the relationship between the ON/OFF timing of a BD signal and the ON/OFF timing of laser light in a case where only one light amount sensor is provided for multiple beams.

FIG. 8 is a view for explaining the relationship between the ON/OFF timing of a BD signal, the ON/OFF timing of laser beam, and the ON/OFF timing of applying a voltage to the EO crystal in a case where only one light amount sensor is provided for multiple beams.

As shown in FIG. 8, if there is only one light amount sensor, in order to switch the light amount detection target from the laser beam A to the laser beam B after APC for the laser beam A is performed, it is necessary to decrease the electric charge in the light amount sensor by turning off the laser beam A once (the turn-off period shown in FIG. 8) and turn on and emit the laser beam B again.

The ON/OFF timing of applying a voltage to the EO crystal is determined as follows. In order to switch the light amount detection target from the laser beam A to the laser beam B, the laser beam A is turned off, and the application of the voltage to the EO crystal ends (OFF interval in FIG. 8) in synchronism with a decrease in charge of the light amount sensor. After that, the application of the voltage to the EO crystal starts.

Figure 9:
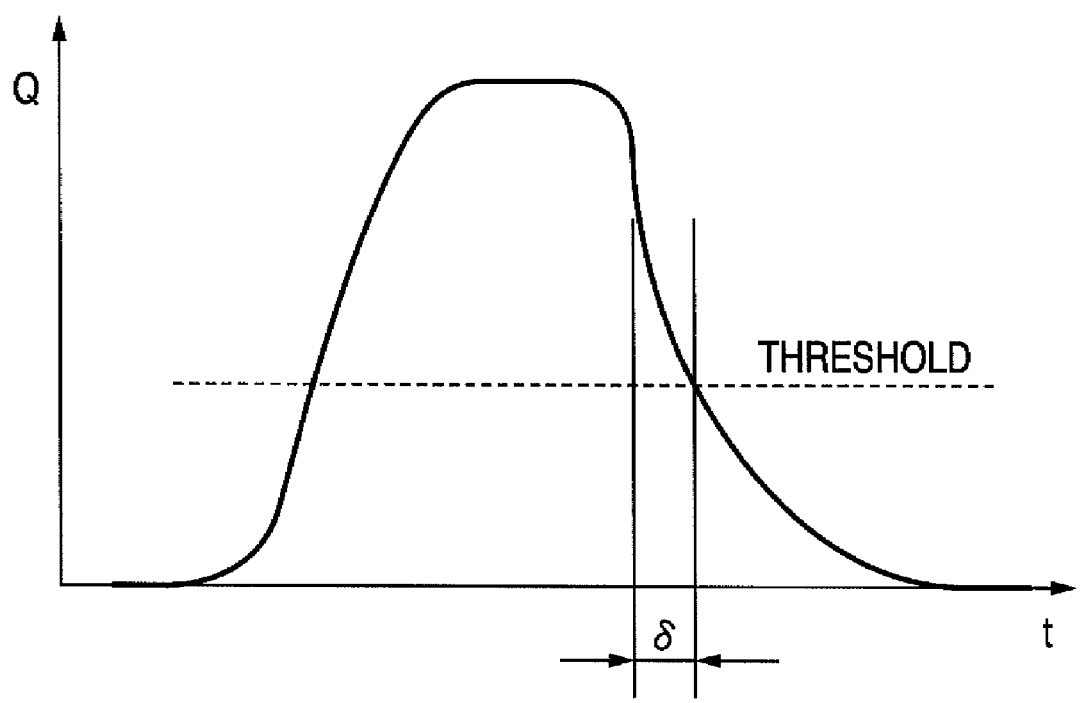
FIG. 9 is a graph showing changes in electric charge over time in a general light amount sensor.

In general, a PD sensor used as a light amount sensor exhibits a trailing edge curve like that shown in FIG. 9 as the electric charge decreases, and may take 3 to 5 ns as a delay time δ until the electric charge decreases below a threshold.

(Case of Two Light Amount Sensors)

Figure 10:
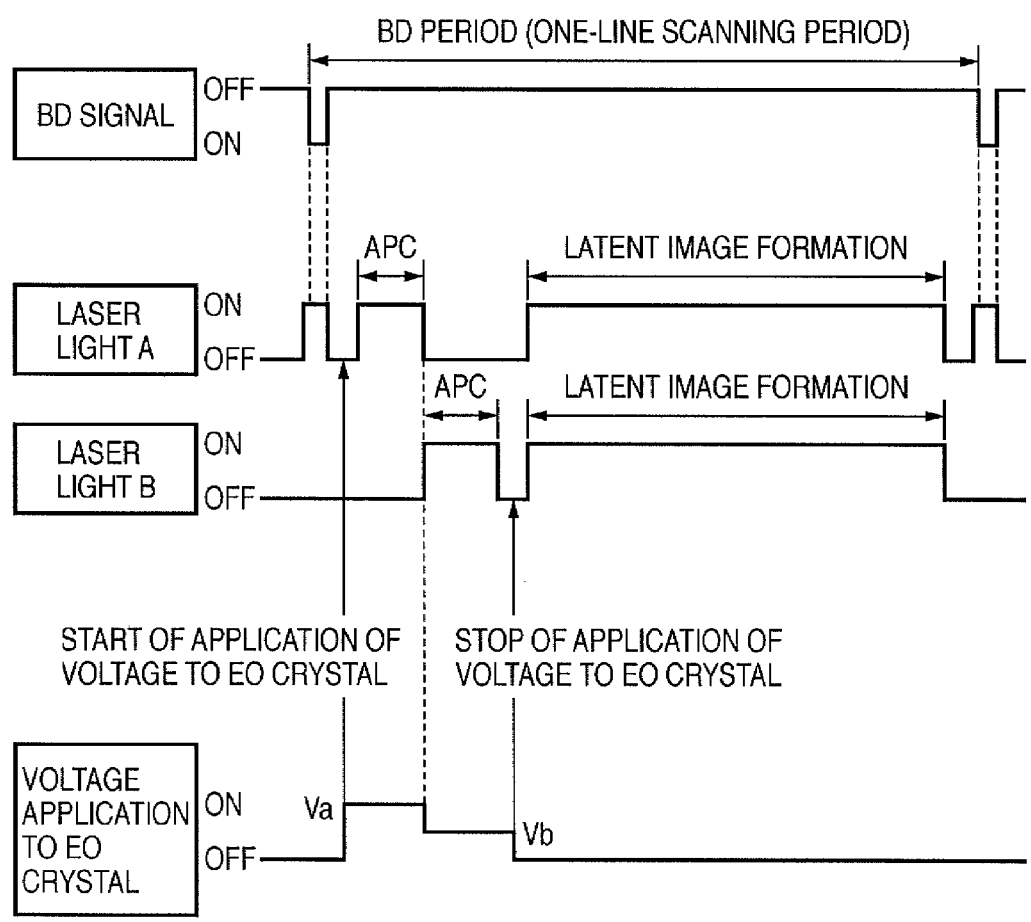
FIG. 10 is a view for explaining the relationship between the ON/OFF timing of a BD signal and the ON/OFF timings of laser light in a case where a plurality of light amount sensors are provided for multiple beams.

FIG. 10 is a view for explaining the relationship between the ON/OFF timing of a BD signal, the ON/OFF timings of laser beam, and the ON/OFF timing of applying a voltage to the EO crystal in a case where a plurality of light amount sensors are provided for multiple beams.

As shown in FIG. 10, since the laser beam A and the laser beam B respectively irradiate different light amount sensors, there is no need to set a turn-off period like that shown in FIG. 8, and it is possible to emit the laser beam B at almost the same time when the laser beam A is turned off. The ON/OFF timing of applying the voltage to the EO crystal is determined such that the laser beam A and the laser beam B irradiate different light amount sensors. This eliminates the OFF interval shown in FIG. 8 and allows continuous control of APC. This makes it possible to greatly increase the light amount detection times for the laser beam A and the laser beam B by the turn-off period which is required in the arrangement including only one light amount sensor.

Effects of Second Embodiment

According to this embodiment, the electro-optical crystal structure 202 makes the laser beam A and the laser beam B emitted from the two light-emitting portions irradiate the light amount sensors 203a and 203b, respectively, by the application of voltages corresponding to the respective light-emitting portions of the MMLD 201. The light amount control unit 313 controls the amount of laser beam A based on the detection result obtained by the light amount sensor 203a, and also controls the amount of laser beam B based on the detection result obtained by the light amount sensor 203b. Therefore, this apparatus can perform APC more accurately with a sufficient light amount while efficiently using a laser beam emitted from the MMLD 201. In addition, the apparatus can emit the laser beam B immediately after turning off the laser beam A, and hence can increase the light amount detection time for each laser light.

Since the laser beam B is turned on as soon as the laser beam A is turned off, the light amounts of a larger number of laser beams can be controlled within a predetermined time assigned as a light amount detection time.

In this embodiment, the laser scanning apparatus 200 comprises the MMLD 201 having the two light-emitting portions and the two light amount sensors 203a and 203b. However, the present invention is not limited to this arrangement, and may comprise an MMLD having a plurality of, more than two, light-emitting portions and light amount sensors of the number corresponding to the number of light-emitting portions.

In addition, the number of light amount sensors may be less than the number of light-emitting portions of the MMLD. Two light amount sensors may are used for the light amount adjustment of the laser beam A to the laser beam D of the four light-emitting portions. More specifically, the laser beam A irradiates on the light amount sensor 203a. The laser beam B is turned on as soon as the laser beam A is turned off, and the laser beam B irradiates on the light amount sensor 203b. The laser light C is turned on as soon as the laser beam B is turned off, and the laser light C irradiates on the light amount sensor 203a. The laser light D is turned on as soon as the laser light C is turned off, and the laser light D irradiates on the light amount sensor 203b. This allows light amount adjustment of a large number of light-emitting portions by a smaller number of light amount sensors without considering the above delay time δ as shown in FIG. 8.

This embodiment uses the monolithic multi-beam laser diode having the two light-emitting portions. However, the present invention is not limited to this, and may form multiple beams by combining laser beams emitted from two laser diodes. Use of a laser having many light-emitting portions such as a vertical cavity-surface emitting laser (VCSEL) can enhance the effect.

<Third Arrangement Example of Optical Scanning Apparatus of Embodiment>

Figure 11:
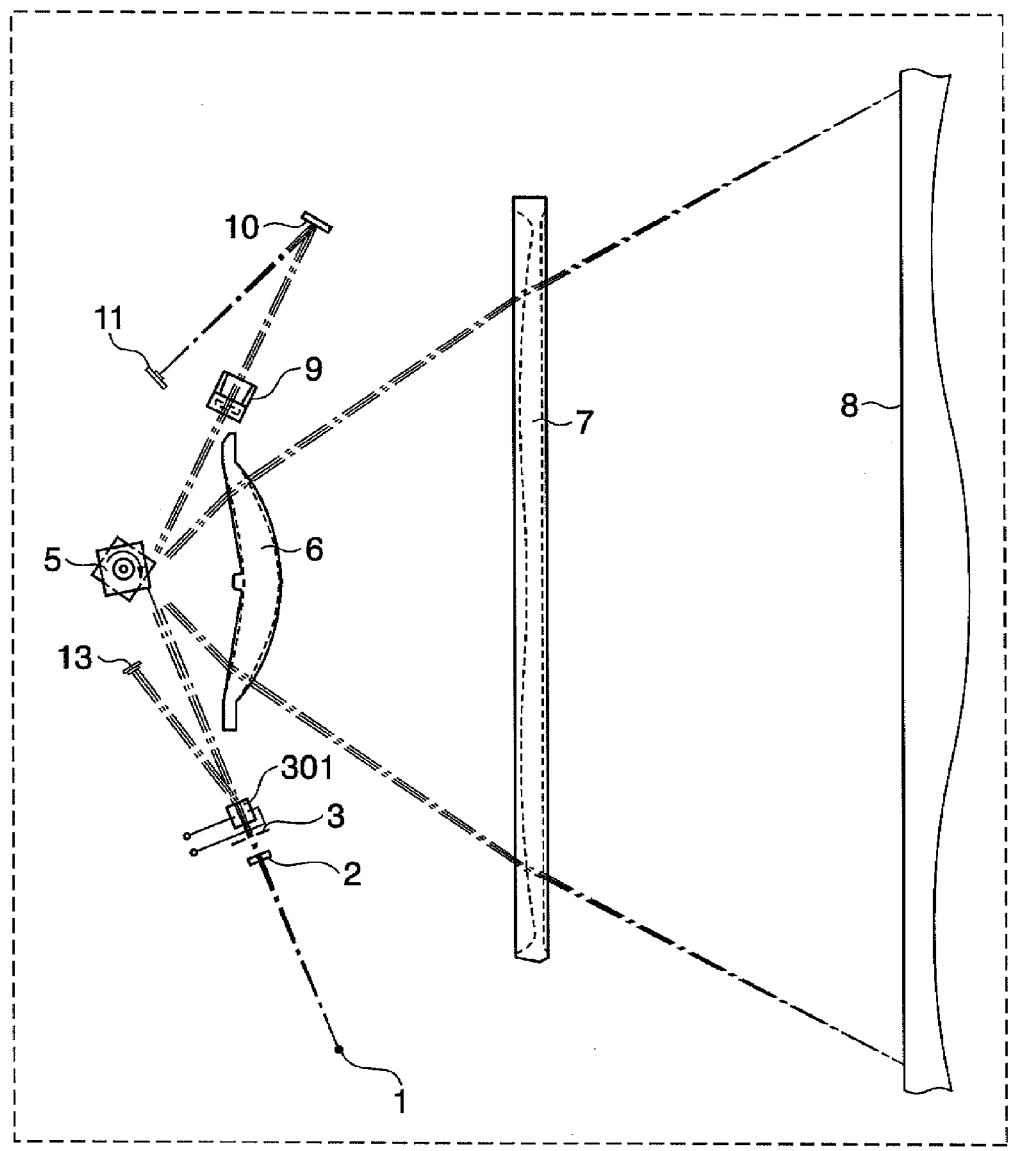
FIG. 11 is a plan view schematically showing an arrangement of a laser scanning apparatus according to the third embodiment of the present invention.

FIG. 11 is a plan view schematically showing the arrangement of a laser scanning apparatus as a optical scanning apparatus according to the third embodiment of the present invention. The arrangement of the third embodiment is similar to that of the first embodiment. The same reference numerals as in the first embodiment denote the same constituent elements, and a repetitive description will be omitted. Different portions will be described below.

As shown in FIG. 11, a laser scanning apparatus 300 comprises a cylindrical lens 301 which is formed by an electro-optical crystal, and is provided in the optical path between a stop member 3 and a polygon mirror 5, so as to deflect a laser beam emitted from a laser diode 1 in the main scanning direction by an applied voltages well as change the laser beam shaped by the stop member 3 in the sub-scanning direction. That is, the cylindrical lens 301 is formed by an electro-optical crystal, and a laser beam emitted from the laser diode 1 is deflected and guided to the light amount sensor 12, and undergoes APC by applying a predetermined voltage to the cylindrical lens 301.

Effects of Third Embodiment

When the cylindrical lens 301 is formed by an electro-optical crystal, since a laser beam irradiating on a light amount sensor 13 is focused in the sub-scanning direction by the effect of the cylindrical lens 301, the shape of the light amount sensor 13 can be small, and the response speed of the light amount sensor 13 can be increased. In addition, integrally forming an electro-optical crystal and a cylindrical lens makes it possible to reduce the number of components of the optical scanning apparatus.

<Still Another Arrangement Example of Optical Scanning Apparatus of Embodiment>

In the above embodiments, the polygon mirror 5 scans on the photosensitive drum 8. However, the present invention is not limited to this arrangement, and may be configured to scan on the photosensitive drum by a galvanometer mirror or a MEMS (Micro Electro Mechanical System).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2006-347772, filed on Dec. 25, 2006 and No. 2007-324018 filed on Dec. 14, 2007, which are hereby incorporated by reference herein in their entirety.

What is claimed is:

1. An optical scanning apparatus comprising:
   a light source adapted to emit a light beam;
   a light scanning unit adapted to deflect the light beam emitted from said light source to scan on an image carrier;

an electro-optical crystal member which is provided in an optical path between said light source and said light scanning unit and deflects the light beam emitted from said light source by an applied voltage;

at least a light amount detecting unit adapted to detect an amount of light beam deflected by said electro-optical crystal member; and a light amount control unit adapted to control the amount of laser beam emitted from said light source based on detection result obtained by said at least light amount detecting units;

wherein said electro-optical crystal member is made of an electro-optical crystal having a characteristic that a refractive index of said electro-optical crystal changes upon an applied voltage, further comprising a voltage control unit adapted to control a voltage applied to the electro-optical crystal;

a processing unit adapted to control turning on and off of said light source and a voltage applied to the electro-optical crystal by said voltage control unit, wherein said processing unit, along with scanning of a laser beam in a main scanning direction, upon BD detection after turning on said light source, turns off said light source and causes said voltage control unit to apply a predetermined voltage to the electro-optical crystal, causes said light amount control unit to start light amount control by making said light source turn on, upon completion of the light amount control, turns off said light source and causes said voltage control unit to stop applying the predetermined voltage to the electro-optical crystal, and causes said light scanning unit to scan the light beam on an image carrier by turning on said light source to emit light.

2. The optical scanning apparatus according to claim 1, wherein
said electro-optical crystal member is made of an electro-optical crystal having a characteristic that a refractive index of said electro-optical crystal changes upon an applied voltage, and
said light amount detecting unit detects an amount of a light beam upon application of a voltage to the electro-optical crystal.

3. The optical scanning apparatus according to claim 1, wherein said voltage control unit comprises a pair of electrode mounted on surfaces of said electro-optical crystal, and
a voltage applied to said pair of electrode forms an electric field in said electro-optical crystal at a right angle with respect to a traveling path of the light beam passing through said electro-optical crystal.

4. The optical scanning apparatus according to claim 1, wherein said electro-optical crystal essentially consists of potassium, tantalum, niobium and oxygen.

5. The optical scanning apparatus according to claim 1, wherein said light source is a surface emitting type laser diode.

6. The apparatus according to claim 1, further comprising
a first lens member which converts the light beam emitted from said light source into a substantially parallel laser beam,
a stop member which shapes the substantially parallel light beam converted by said first lens member into a desired shape, and
a second lens member which changes the light beam shaped by said stop member in a sub-scanning direction, and makes the changed light beam travel to an incident face of the electro-optical crystal.

7. An optical scanning apparatus comprising:
a light source having a plurality of light-emitting portions adapted to emit a plurality of light beams;
a light scanning unit adapted to scans the light beams emitted from said light source;
an electro-optical crystal member which is provided in an optical path between said light source and said light scanning unit and deflects the laser beams emitted from said light source by applied voltages;
a plurality of light amount detecting units adapted to detect the amounts of laser beams deflected in different directions by said electro-optical crystal member; and
a light amount control unit adapted to control the amount of laser beams emitted from said light source based on detection results obtained by said plurality of light amount detecting units,
wherein said electro-optical crystal member makes a plurality of laser beams emitted from the plurality of light-emitting portions irradiate on said different light amount detecting units by application of different voltages in accordance with respective the light-emitting portions of said light source, and
said light amount control unit controls the amount of one laser beam based on a detection result obtained by one light amount detecting unit, and controls the amount of another laser beam based on a detection result obtained by another light amount detecting unit;
wherein said electro-optical crystal member is made of an electro-optical crystal having a characteristic that a refractive index of said electro-optical crystal changes upon an applied voltage,
further comprising a voltage control unit adapted to control the different voltages applied to the electro-optical crystal;
a processing unit adapted to control turning on and off of said light source and a voltage applied to the electro-optical crystal by said voltage control unit,
wherein said processing unit, along with scanning of a laser beam in a main scanning direction,
upon BD detection after starting turning on one light-emitting portion of said light source, turns off the one light-emitting portion of said light source, and causes said voltage control unit to apply a first voltage to the electro-optical crystal,
causes said light amount control unit to start light amount control by making the one light-emitting portion of said light source turn on,
upon completion of the light amount control, turns off the one light-emitting portion of said light source and causes said voltage control unit to apply a second voltage to the electro-optical crystal,
causes said light amount control unit to start light amount control on another laser beam by emitting light from the another light-emitting portion of said light source,
upon completion of the light amount control, turns off the another light-emitting portion of said light source and stops application of voltage to the electro-optical crystal by said voltage control unit, and
causes said light scanning unit to scan the light beams on an image carrier by turning on the plurality of light-emitting portions of said light source.

* * * * *